(12) United States Patent
Sawada

(10) Patent No.: US 9,223,526 B2
(45) Date of Patent: Dec. 29, 2015

(54) APPARATUS, METHOD, AND STORAGE MEDIUM

(71) Applicant: CANON KABUSHIKI KAISHA, Tokyo (JP)

(72) Inventor: Hideharu Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/043,673

(22) Filed: Oct. 1, 2013

(65) Prior Publication Data
US 2014/0092399 A1  Apr. 3, 2014

(30) Foreign Application Priority Data
Oct. 2, 2012 (JP) ................... 2012-220480

(51) Int. Cl.
*G06K 15/02* (2006.01)
*G06F 3/12* (2006.01)
*G06K 15/00* (2006.01)

(52) U.S. Cl.
CPC ............ *G06F 3/1253* (2013.01); *G06F 3/1208* (2013.01); *G06F 3/1285* (2013.01)

(58) Field of Classification Search
CPC .............................. G06F 3/1254; G06F 3/1255
See application file for complete search history.

(56) References Cited

U.S. PATENT DOCUMENTS

| 2010/0060908 A1* | 3/2010 | Kurata ........................... 358/1.2 |
| 2010/0245922 A1* | 9/2010 | Arai ............................. 358/1.18 |
| 2011/0235064 A1* | 9/2011 | Arai .............................. 358/1.2 |

FOREIGN PATENT DOCUMENTS

JP      2010-067034 A    3/2010

\* cited by examiner

*Primary Examiner* — Dov Popovici
(74) *Attorney, Agent, or Firm* — Canon USA, Inc., IP Division

(57) ABSTRACT

According to an aspect of the present invention, an apparatus includes an area setting unit configured to set, in a case where it is not determined that a page of an aspect ratio can be set in an application, a data arrangement area which the data to be printed is arranged, in a page setting of the application, so that an aspect ratio of the data arrangement area fits to the aspect ratio of the printing area, and a scaling setting unit configured to set a scaling of the page in which the data arrangement area set by the area setting unit, so that the page is scaled in accordance with the printing area and the data arrangement area, based on a size of the page and the size of the printing area.

20 Claims, 14 Drawing Sheets

SHEET SIZE
DESIGNATED
BY USER

PAGE DATA AFTER SCALING

APPARATUS, METHOD, AND STORAGE MEDIUM

BACKGROUND OF THE INVENTION

1. Field of the Invention

The present invention relates to an apparatus and a method for specifying settings for performing printing, and a storage medium.

2. Description of the Related Art

Conventionally, there is a technique for allowing a printing apparatus to easily print data generated by an application on a print medium desired by a user.

Japanese Patent Application Laid-Open No. 2010-067034 discusses a technique which sets a predetermined page size with respect to a spreadsheet application and a printer driver. As a result, table data generated using the spreadsheet application is printed in a size which fits to a sheet width. More specifically, a page size matching horizontal and vertical sizes of table data is set to the spreadsheet application. The printer driver is then set to scale the page output by the spreadsheet application to fit the sheet width. The printer driver thus scales an image of the table data output from the spreadsheet application to fit the sheet width, so that the table is printed to fit the sheet width.

However, if there is an upper limit or a lower limit on the page size which can be set in the application, an aspect ratio of the page which can be set in the application will be restricted. In such a case, the data to be printed may not be appropriately printed even when the page size is set in the application and the printer driver as discussed in Japanese Patent Application Laid-Open No. 2010-067034.

For example, if the aspect ratio of an area to be printed in the application exceeds the limit on the aspect ratio of the page which can be set in the application, the page of the size which matches the horizontal and vertical sizes of the area cannot be set to the application. In other words, the page size and the size of the area to be printed do not match. In such a case, if the printer driver scales the page including the area to be printed on according to the sheet size, the size of the area to be printed on and the sheet size may not match.

SUMMARY OF THE INVENTION

The present invention is directed to an apparatus and a method for specifying settings so that data generated by an application is appropriately printed according to a size of a printing area.

According to an aspect of the present invention, an apparatus includes a determining unit configured to determine, based on a size of a printing area in which data generated by an application is printed, whether a page having an aspect ratio of the printing area can be set in the application, an area setting unit configured to set, in a case where the determining unit does not determine that the page having the aspect ratio can be set in the application, a data arrangement area which the data to be printed is arranged, in a page setting of the application, so that an aspect ratio of the data arrangement area fits the aspect ratio of the printing area, and a scaling setting unit configured to set a scaling of the page in which the data arrangement area set by the area setting unit, so that the page is scaled in accordance with the printing area and the data arrangement area, based on a size of the page and the size of the printing area.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
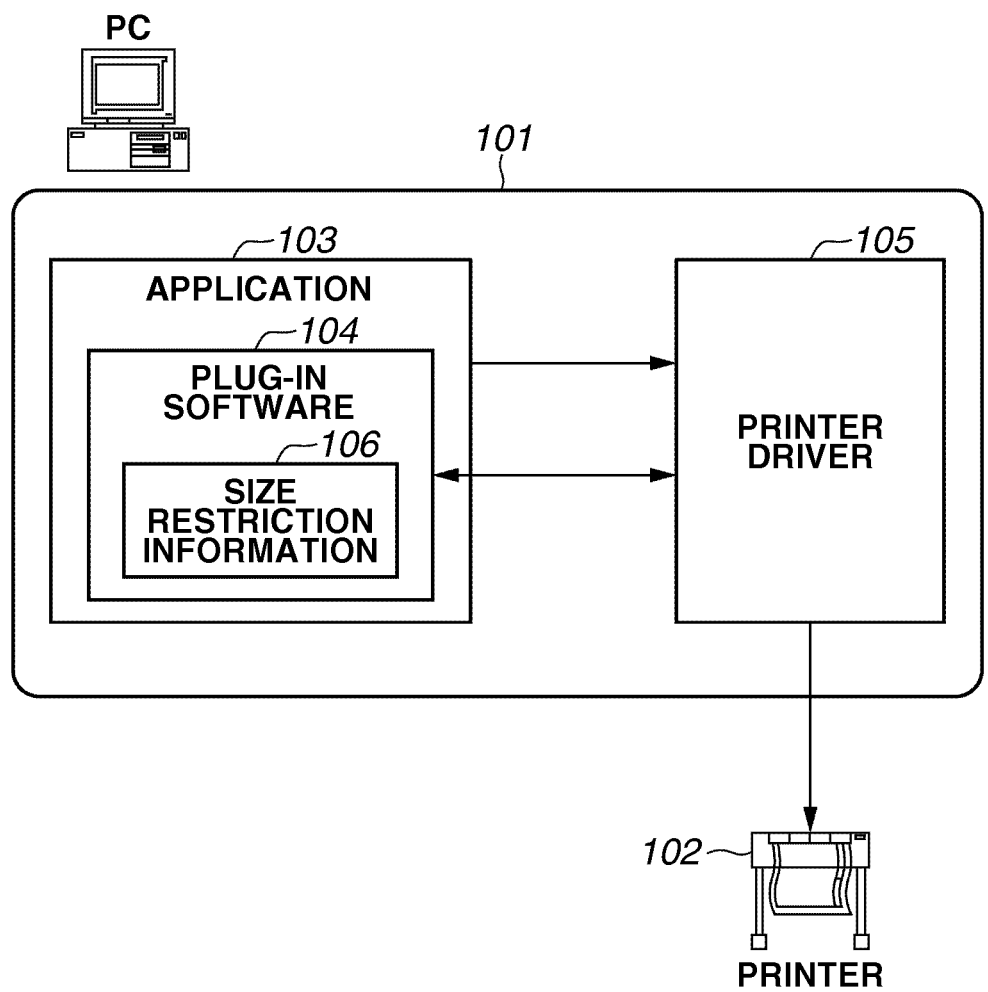
FIG. 1 illustrates a printing system according to an exemplary embodiment of the present invention.

FIG. 1 illustrates a printing system according to an exemplary embodiment. Referring to FIG. 1, the printing system according to the present exemplary embodiment includes a PC 101 and a printer 102. The printer 102 is a printing apparatus which prints an image on a print medium such as a print sheet. For example, the printer 102 prints an image on a continuous sheet such as roll paper. Upon printing on the roll paper, the printer 102 cuts the roll paper at a position corresponding to a trailing end of a portion on which the image is printed thereon. In other words, the printer 102 cuts the roll paper according to the size of a printed image, so that the image can be continuously printed without being divided into a plurality of sheets. Roll paper printing is thus used for printing a poster, a hanging banner, a horizontal, banner, and the like.

An application 103 runs on the PC 101. According to the present exemplary embodiment, a document application for generating a document based on input of character strings will be described as an example.

A printer driver 105 controls the printer 102. The printer driver 105 receives data to be printed from the application 103 via an operating system (OS). The printer driver 105 then generates, based on the received data, print data and an image interpretable by the printer 102. The printer driver 105 transmits the generated print data to the printer 102 via the OS, and thus the printer 102 can perform printing.

Further, the printer driver 105 performs print settings such as a sheet size for the printer 102 to print an image. Furthermore, the printer driver 105 is capable of scaling an image to be printed based on a scaling rate according to an instruction from the user or the plug-in software, which is described below, when the printer 102 prints an image.

Plug-in software 104 (hereinafter referred to as a plug-in) which expands functions of the application runs on the application 103. The plug-in 104 performs settings with respect to the application 103 and the printer driver 105. For example, the plug-in 104 can perform settings of a page size, a margin in the page, and a setting related to a text box with respect to the application 103. Further, the plug-in 104 can designate a print setting and perform a setting related to scaling of the data to be printed with respect to the printer driver 105.

According to the present exemplary embodiment, a user can designate no the plug-in 104, a size of a sheet when printing is performed by the printer 102. The plug-in 104 performs settings for printing an image of a size corresponding to the sheet size designated by the user with respect to the application 103 and the printer driver 105. The details will be described below.

Size restriction information 106 which is stored in the plug-in 104 indicates an upper limit or a lower limit of the page size that can be set in the application 103. According to the present exemplary embodiment, it is assumed that the page size is limited in the application 103 to 100 mm to 550 mm page width and 100 mm to 550 mm page height.

If the printer driver 105 does not perform the scaling process, the printer 102 prints an image according to the page size set in the application 103. In other words, if the application 103 generates data according to the page size corresponding to a predetermined sheet size, the application 103 outputs to the printer driver 105 the data for printing on the sheet of the predetermined size. In such a case, if the printer driver 105 does not scale the image, the image of the size corresponding to the predetermined size is transmitted to the printer 102.

Figure 2:
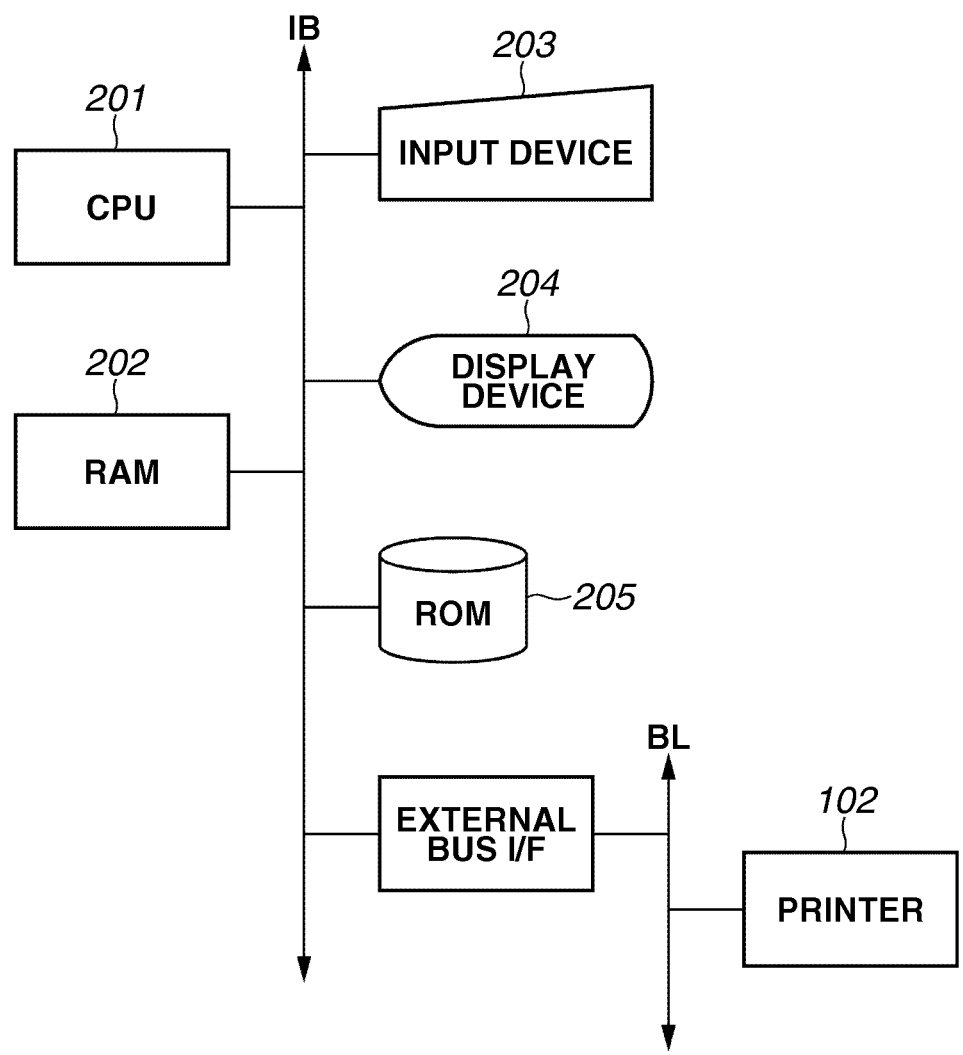
FIG. 2 illustrates a configuration of a personal computer (PC).

FIG. 2 illustrates the configuration of the PC 101.

Referring to FIG. 2, the PC 101 includes a central processing unit (CPU) 201, a random access memory (RAM) 202, and an input device 203 such as a mouse, a keyboard, and a touch panel. Further, the PC 101 includes a display device 204 such as a cathode ray tube (CRT) and a liquid crystal display (LCD), and a read-only memory (ROM) 205 such as a magneto-optical disk. An internal bus line IF connects the above-described elements.

According to the present exemplary embodiment, the ROM 205 stores the plug-in 104, the application 103, the printer driver 105, the OS, and other program information. The CPU 201 executes various programs stored in the ROM 203 on the RAM 202, and can thus perform the processes according to the present exemplary embodiment.

The internal bus line IB in the PC 101 is connected to the printer 102 by an external bus line BL. The PC 101 can transmit a print job to the printer 102 via the external bus line BL.

The input device 203 is an operation device to be operated by a user, and is capable of inputting various instructions from the user to the PC 101. The CPU 201 displays various data pieces on the display device 204 according to the user instruction input from the input device 203. For example, the CPU 201 displays on the display device 204, operation screens provided by the application 103, the plug-in 104, and the printer driver 105. Further, the CPU 201 can display on the display device 204, icons, menus, and other objects for the user to issue various instructions. The user operates the input device 203 according to such display items, and can thus issue various instructions. Furthermore, the CPU 201 performs print control for causing the printer 102 to print an image according to the user instruction input from the input device 203. More specifically, when the user uses the input device 203 and issues a print instruction to the application 103, the CPU 201 causes the application 103 to output the data to be printed to the printer driver 105. Further, the CPU 201 causes the printer driver 105 to generate an image based on the data to be printed, and causes the printer 102 to output the generated image.

Figure 3:
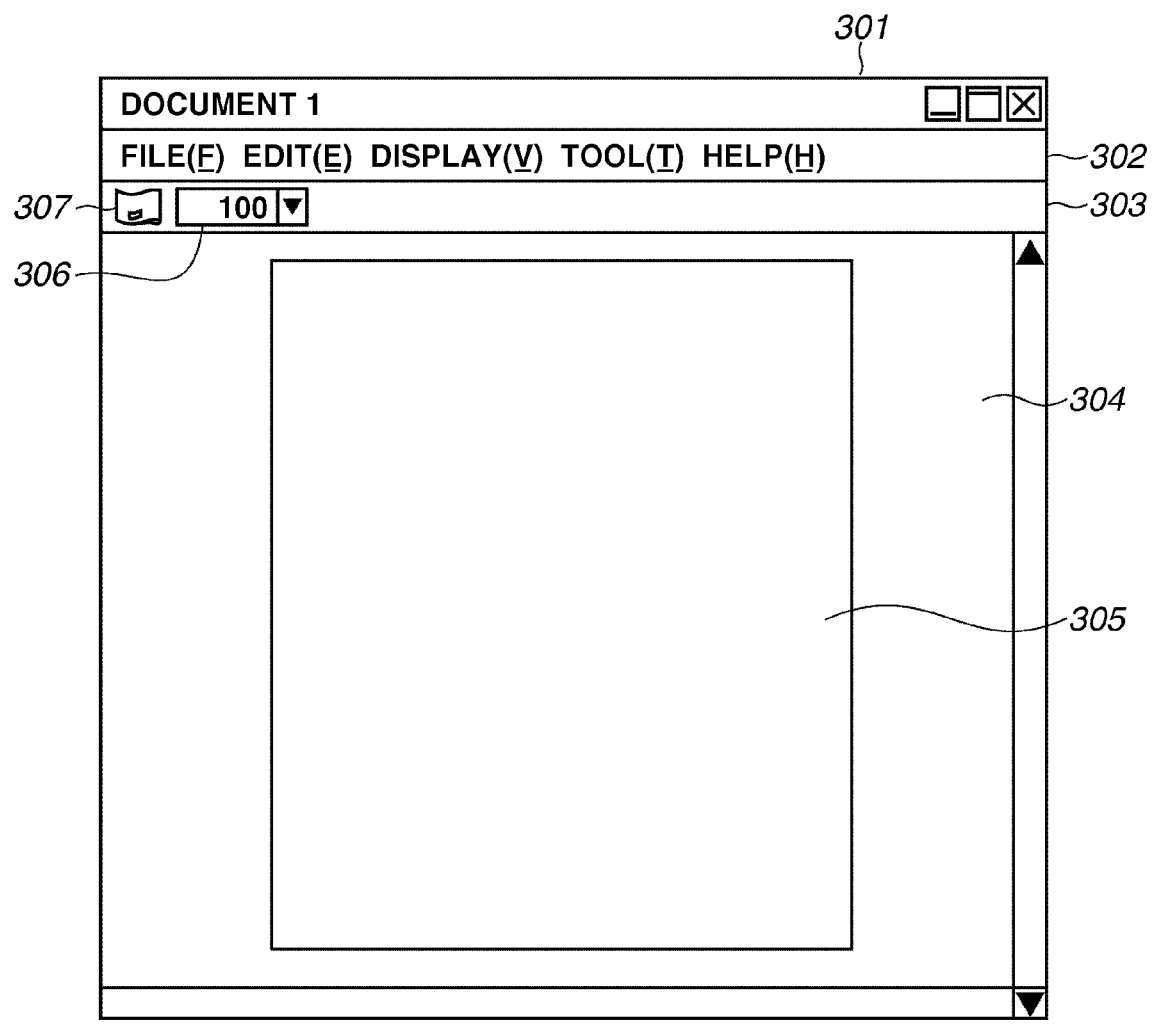
FIG. 3 illustrates a screen displayed by an application.

FIG. 3 illustrates screen displayed by the application. The screen is displayed when the application 103 is activated.

Referring to FIG. 3, a title bar 301 in the screen of the application displays a title of a document currently being created or an application name. A menu bar 302 displays functions provided to the application 103 in a menu form. Icons for executing the functions provided to the plug-in and the application are arranged in a tool bar 303. A document display area 304 displays the document being created by the user.

As illustrated in FIG. 3, the document display area 304 displays a document 305 currently being edited by the user. At that time, a size and an aspect ratio of the displayed document 305 correspond to the page size set in the application 103. According to the present exemplary embodiment, when the user activates the application 103, an A4 size (210 mm width and 297 mm height) is set as the page size. A display magnification designation box 306 is used by the user to designate the display magnification of the document 305 in the document display area 304.

An activation icon 307 is for activating the plug-in 104 according to the present exemplary embodiment. The activation icon 307 is displayed as illustrated in FIG. 3 when the user installs the plug-in 104 in the PC 101, and the plug-in 104 becomes a state capable of running on the application 103 as illustrated in FIG. 1. If the user designates the activation icon 307 on the screen illustrated in FIG. 3, the plug-in 104 can be activated.

Figure 4:
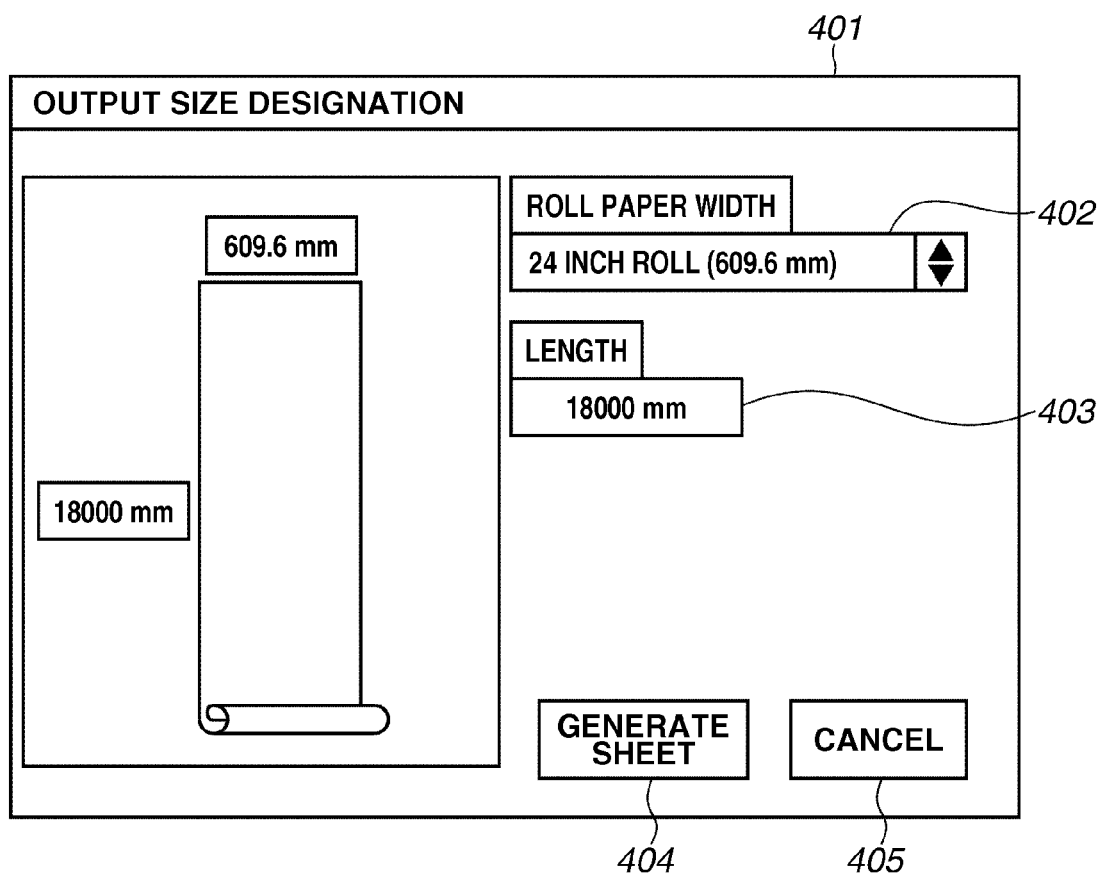
FIG. 4 illustrates an output size designation dialog.

FIG. 4 illustrates an output size designation dialog displayed by the plug-in 104 when the user designates the activation icon 307 illustrated in FIG. 3.

Referring to FIG. 4, an output size designation dialog 401 is used by the user to designate a size of a print medium on which the printer 102 is to print an image. According to the present exemplary embodiment, the printer 102 performs printing on the roll paper, so that the output size designation dialog 401 is displayed to allow the user to designate a width of the roll paper. A sheet width designation box 402 is for designating the width of the roll paper, and a sheet length designation box 403 is for designating a length of an area in the roll paper in which an image is to be printed.

The user can select a desired sheet width from a plurality of sheet width candidates in the sheet width designation box 402. According to the present exemplary embodiment, the user can designate the sheet length in millimeters in the sheet length designation box 403. According to the example illustrated in FIG. 4, the user has designated the roll paper of 24 inches width and 18000 mm length.

According to the present exemplary embodiment, an image of a size corresponding to the sheet size that the user has designated on the output size designation dialog 401 can be printed, as will be described below. For example, the user designates on the output size designation dialog 401 a size of a poster or a hanging banner, and sets on the printer 102 the roll paper having the width corresponding to the designated size. The printer 102 can thus print the poster or the hanging banner of the size designated by the user.

If the user presses a sheet generation button 404, the plug-in 104 sets the application 103 and the printer driver 105 to perform printing according to the sheet size set on the output size designation dialog 401. When the user presses the sheet generation button 404, the plug-in 104 closes the output size designation dialog 401, and the screen of the application 103 is displayed.

The user can press a cancel button 405 at an arbitrary timing while the output size designation dialog 401 is being displayed. If the user presses the cancel button 405, the content set by the user on the output size designation dialog 401 becomes invalid. The output size designation dialog 401 is then closed, and the items to be input by the user are displayed on the screen of the application 103.

If the user presses the sheet generation button 404, the plug-in 104 sets the page size with respect to the application 103. The plug-in 104 sets the page size according to the aspect ratio based on the sheet width and the sheet length designated on the output size designation dialog 401. Further, the plug-in 104 sets the page size so that the width of the document being edited by the application 103 fits to the width of one page.

Furthermore, the plug-in 101 activates the printer driver 105 according to the user pressing the sheet generation button 404. The plug-in 104 then sets to the printer driver 105 the scaling rate of the page data so that the width of the page output from the application 103 matches the sheet width set on the output size designation dialog 401

Upon setting the application 103 and the printer driver 105 as described above, the plug-in 104 instructs the application 103 to perform printing. The application 103 then outputs to the printer driver 105, the page data in which the document data is arranged on the page of the page size set by the plug-in 104. The printer driver 105 scales the page data according to the scaling rate set as described above and generates an image. As a result, the image to be printed by the printer 102 is generated having the width according to the sheet width, and the image is output to the printer 102.

According to the processes performed by the plug-in 104 as described above, the printer 102 thus prints the image indicating the data generated by the application 103 in a size corresponding to the sheet size set by the user on the output size designation dialog 401, on a sheet of the set sheet size.

There may be an upper limit and a lower limit on the page size that can be set with respect to the application 103. According to the present exemplary embodiment, the page size in which the page width and the page height are respectively 100 mm to 550 mm can be set to the application. If there is a limit on the page size that can be set to the application as described above, the user may not be able to obtain an intended print result.

Figure 5A:
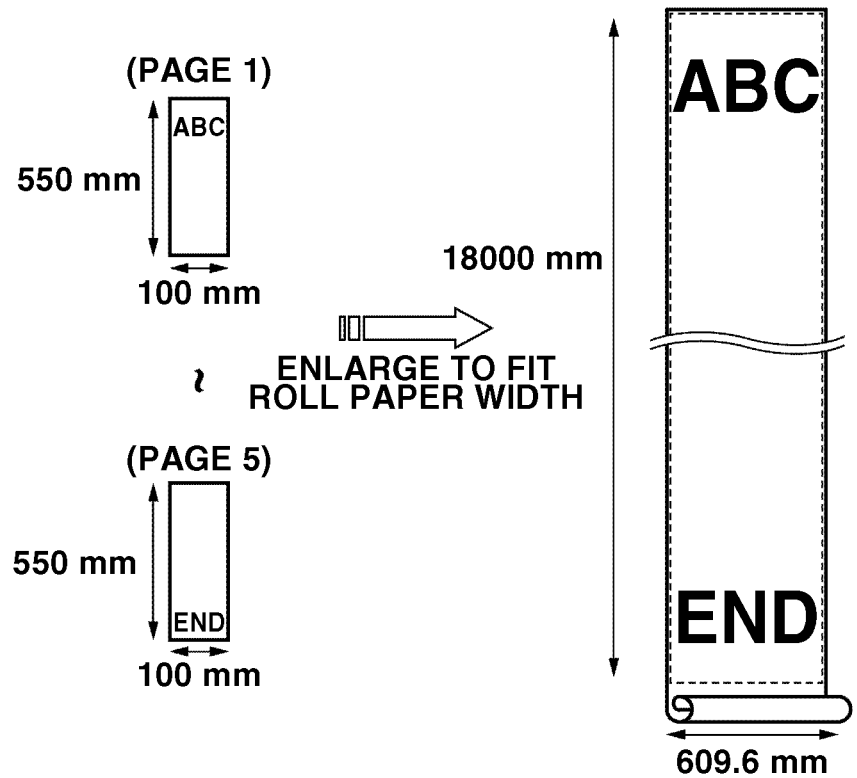
FIGS. 5A and 5B illustrate examples of a print result.
Figure 5B:
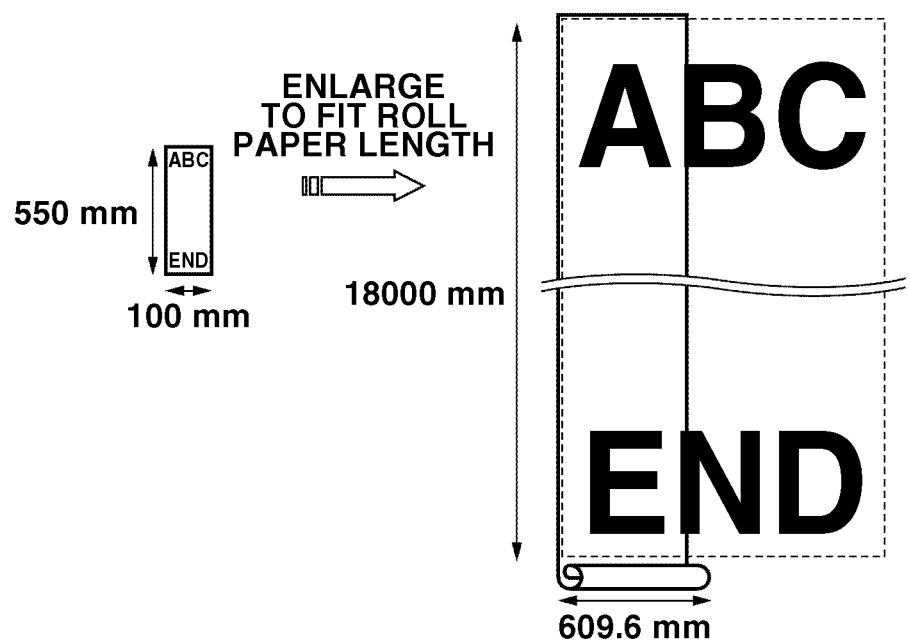

FIGS. 5A and 5B illustrates examples of print results.

More specifically, FIG. 5A illustrates a print result in the case where a page has been divided in the application 103. Referring to FIG. 5A, it is assumed that an area which starts from a character string "ABC" and ends by a character string "END" is printed to fit a roll paper width. If the number of rows in the area to be printed (i.e., the area from "ABC" to "END" is large, the document may be divided into a plurality of pages even if the page size of the longest sheet size (i.e., 550 mm length and 100 mm width) that can be set in the application 103 is set. In such a case, the print result includes unnecessarily margins between the pages, and the user may not obtain the intended print result. For example, if the user is to create a hanging banner, and the page is divided between the characters, the margins between the pages may be formed between the characters. In such case, a space between the characters continuing within a page and a space between the characters continuing over the page may be different, so that the user cannot obtain the desired print result. In addition, if the data to be originally printed as one object, such as a photographic image, is divided into plurality pages, the data may be divided by a margin between pages and be printed.

FIG. 5B illustrates an example of a print result when an image to be printed is scaled to fit a length of the roll paper. Referring to FIG. 5B, it is assumed that a user desires to print on paper of 18000 mm length and 609.6 mm width. However, since the page width and the page height are respectively between 100 mm and 550 mm in the application 103 as described above, the page size of the longest length becomes 100 mm×550 mm as illustrated in FIG. 5B. If the page of such page size is then scaled to fit the length of 18000 mm, the image to be printed extends to outside of the roll paper in a width direction as illustrated in FIG. 5B, and the image may not be appropriately printed.

According to the present exemplary embodiment, the plug-in 104 performs processes so that a data arrangement area in which data is to be arranged in the page of the application 103 is restricted according to the aspect ratio of the sheet designated by the user. The page data arrangement area is restricted to prevent the data arrangement area in the page from extending to outside the sheet, even if the page on which the data to be printed is arranged is scaled according to the length of the sheet, and the page extends to outside of the sheet. As a result, the data to be printed is prevented from extending to outside of the sheet width, and from being divided into a plurality of pages. The determination of the data at area according to the present exemplary embodiment will be described below with reference to FIG. 11.

Figure 11:
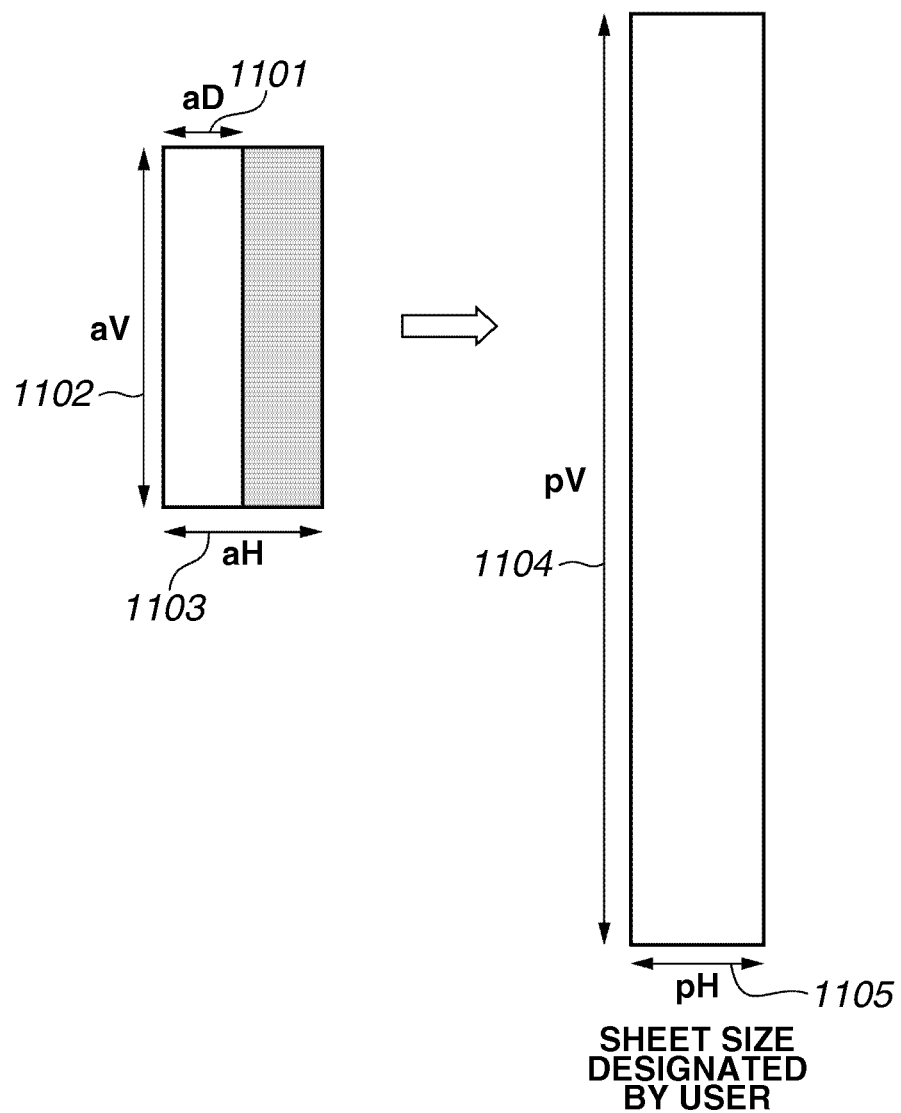
FIG. 11 illustrates a data arrangement area in an application.

FIG. 11 illustrates the data arrangement area in the application.

Referring to FIG. 11, a maximum height aV 1102 and a minimum width aH 1103 respectively indicate values of the page size that can be set in the application 103. In addition, a length pv 1104 and a width pH 1105 respectively indicate values of the sheet size designated by the user on the output size designation dialog 401 illustrated in FIG. 4, i.e., the size of the sheet on which the page generated by the application is to be printed.

The plug-in 104 sets the page size in the application 103 so that the aspect ratio of the page size set by the application 103 matches the aspect ratio of the sheet size designated by the user. However, if the sheet size is extremely long in the vertical direction as illustrated in FIG. 11, the aspect ratios may not match even if the plug-in 104 sets the page size of the longest length in the application 103. In such a case, the plug-in 104 determines a width aD 1101 of the data arrangement area so that the aspect ratio of the data arrangement area in the application 103 matches the aspect ratio of the sheet size designated by the user. The plug-in 104 then sets to the application 103 the data arrangement area in which the height is eV 1102 and the width is aD 1101.

Figure 12:
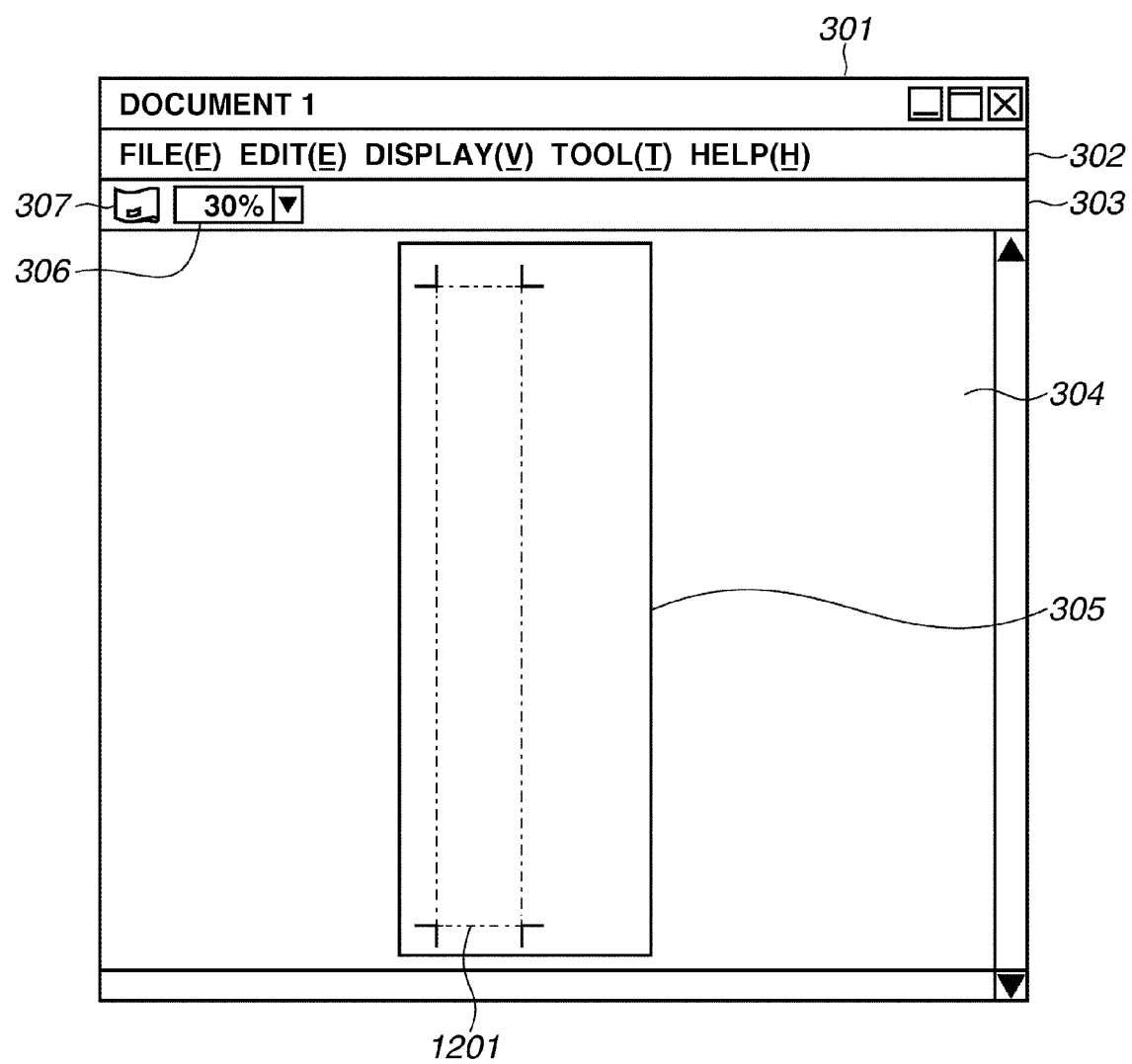
FIG. 12 illustrates an example of a data arrangement area in a document application.

FIG. 12 illustrates an example of the display screen in the case where the data arrangement area is set in a document application according to the present exemplary embodiment. Referring to FIG. 12, a data arrangement area 1201 is an area indicated by a dotted-line frame. The aspect ratio of the data arrangement area corresponds to the aspect ratio of the sheet size designated by the user on the output size designation dialog 401 illustrated in FIG. 4.

When designating the data arrangement area on the document application, the plug-in 104 sets the width of the margin to be arranged on an outer side of the data arrangement area 1201 according to the size of the data arrangement area 1201. In the case of the document application, the user can designate the width of the margin. However, the plug-in 104 issues an instruction to the application 103 for designating the margin in place of the user, and thus sets the margin. In addition, the printer driver 105 scales the page data output from the application 103 according to the length of the sheet size based on the instruction from the plug-in 104.

The method for setting the margin with respect to the application 103 is not limited to transmitting to the application 103 an instruction similar to the user operation, and various setting methods can be used. For example, if a value related to the margin is to be written in the data to be printed which is transmitted from the application 103 to the printer driver 105, the plug-in 104 may rewrite the value related to the margin to match the data arrangement area, and thus set the margin.

Figure 13:
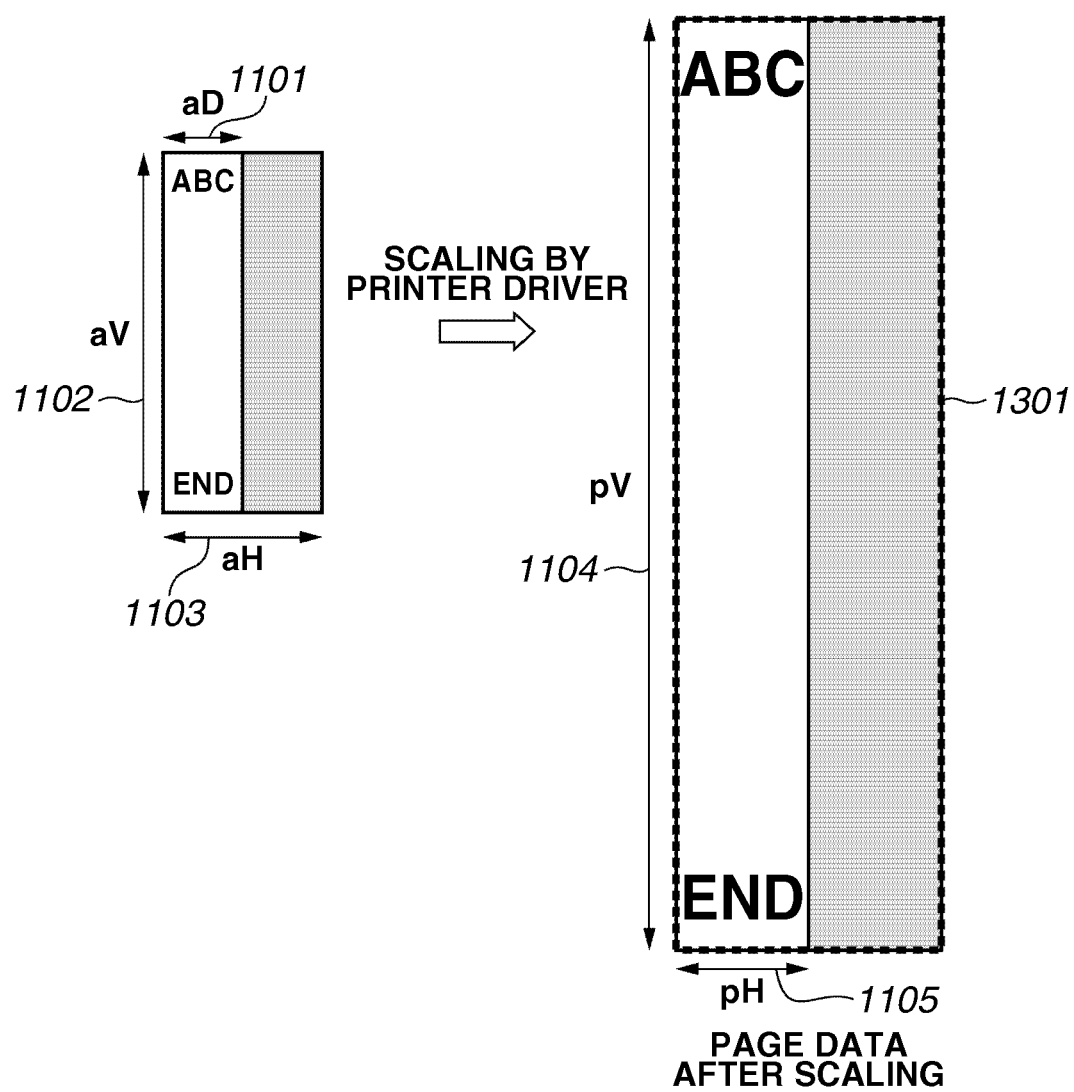
FIG. 13 illustrates a scaling result of page data by a printer driver.

FIG. 13 illustrates a scaling result of the page data by the printer driver. Referring to FIG. 13, the plug-in 104 causes the printer driver 105 to scale the page of the page size aH×aV illustrated in FIG. 13 to match the length (pV) of the sheet size. As a result, a right side of a page 1301 extends to outside of the sheet similarly as in the case illustrated in FIG. 5B.

However, the data arrangement area in the application 103 is set to correspond to the aspect ratio of the sheet size as illustrated in FIGS. 11 and 12. The portion corresponding to the data arrangement area in the page 1301 is thus printed on the sheet, and the portion corresponding to the margin extends to the outside. Accordingly, if the user inputs the character strings "ABC" and "END" to the data arrangement area as illustrated in FIG. 13, the character strings are arranged within the sheet size. The characters input by the user to the application 103 can thus be printed without extending to outside of the sheet.

Setting processes performed by the plug-in 104 with respect to the application 103 and the printer driver 105 will be described in detail below with reference to the flowcharts. In particular, the process for determining the size of the data arrangement area performed in step S606 in a flowchart illustrated in FIG. 6 will be described in detail below with reference to a flowchart illustrated in FIG. 7.

Figure 6:
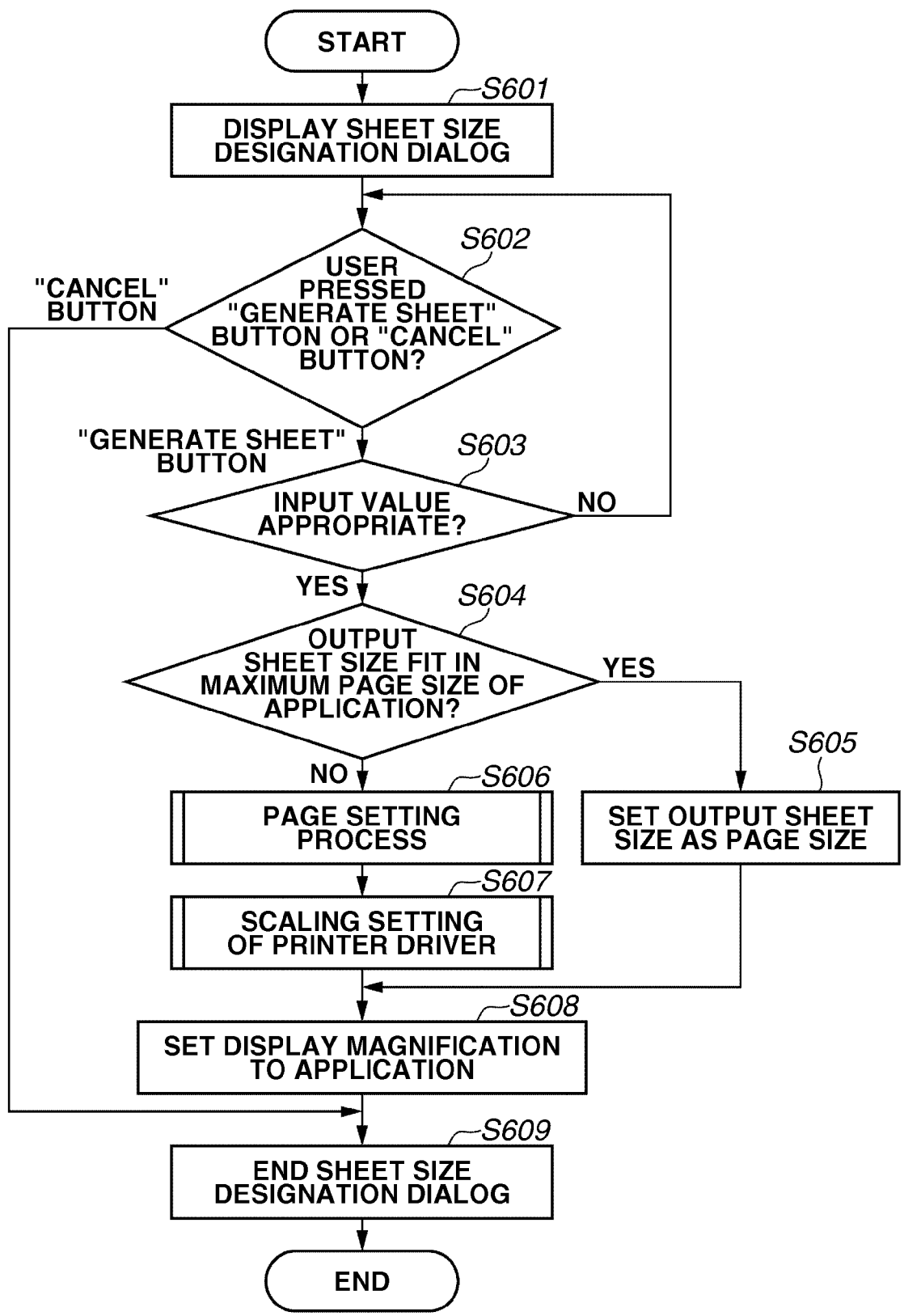
FIG. 6 is a flowchart illustrating a process performed by plug-in software according to the exemplary embodiment of the present invention.

FIG. 6 is a flowchart illustrating the process of the plug-in software according to the present exemplary embodiment. The process is realized by the CPU 201 illustrated in FIG. 2 executing on the RAM 202, i.e., the work memory, the program corresponding to the plug-in 104 stored in the ROM 205.

Upon the user pressing the activation icon 307 on the tool bar 303 of the application 103, the plug-in program is activated, and the CPU 201 starts the process of the flowchart illustrated in FIG. 6.

In step S601, the CPU 201 displays the output size designation dialog 401 illustrated in FIG. 4. The user can designate the roll sheet width and length using the output size designation dialog 401.

In step S602, the CPU 201 waits for a user input, and determines the button pressed by the user. If the CPU 201 determines that the user has pressed the sheet generation button 404 in the output size designation dialog 401 ("GENERATE SHEET" BUTTON in step S602), the process proceeds to step S603. Whereas, if the CPU 201 determines that the user has pressed the cancel button 405 ("CANCEL" BUTTON in step S602), the process proceeds to step S609.

In step S603, the CPU 201 determines whether the values input to the sheet width designation box 402 and the sheet length designation box 403 are appropriate. If values other than numerical values are input, a minus value is input, a value is not input, or a size not supported to be output by the printer 102 is input, it is determined that the input values are not appropriate. In step S603, the plug-in 104 inquires the printer driver 105 on whether the input value is supported by the printer 102, based on the input value. In addition, the plug-in 104 may previously obtain the sizes supported by the printer 102 from the printer driver 105 before performing the determination in step S603. In such a case, the CPU 201 compares the supported sizes and the input values, and determines whether the input values are appropriate values.

If the CPU 201 determines that the page size is inappropriate (NO in step S603), the CPU 201 causes the display device 204 to display a warning dialog. If the user then presses a confirmation button on the warning dialog, the process returns to step S602, and the CPU 201 again waits for the user to input to the output size designation dialog 401. Whereas if the CPU 201 determines that the page size is appropriate (YES in step S603), the process proceeds to step S604.

In step S604, the CPU 201 determines whether the sheet size designated by the user fits in a maximum page size that can be set in the application 103. More specifically, the CPU 201 identifies, based on the size restriction information 106 stored in the plug-in 104, the maximum page size (i.e., 550 mm width×550 mm height) in the application 103. The CPU 201 then compares the horizontal and vertical lengths of the sheet size designated by the user in step S602 respectively with the width and the height of the maximum page size. If at least one of the dimensions of the sheet size is greater than the respective dimension of the maximum page size, the CPU 201 determines that the sheet size does not fit in the page size.

If the CPU 201 determines that the sheet size designated by the user fits in the maximum page size in the application (YES in step S604), the process proceeds to step S605. In step S605, the CPU 201 sets the sheet size designated by the user in step S602 as the page size in the application 103. As a result, when printing is to be performed, the application 103 outputs to the printer driver 105 the data of the page corresponding to the sheet size designated by the user. Printing can thus be appropriately performed on a print sheet.

If the CPU 201 determines that the sheet size designated by the user does not fit in the maximum page size in the application (NO in step S604), the process proceeds to step S606 and the page size corresponding to the sheet size is set. In step S606, if the sheet size is extremely long in the vertical direction, the CPU 201 sets the data arrangement area with respect to the application 103 as described above with reference to FIGS. 11 and 12. The process performed in step S606 will be described in detail below with reference to FIG. 7.

In step S607, the CPU 201 performs a scaling setting with respect the printer driver 105. More specifically, the CPU 201 performs the scaling setting to the printer driver 105 so that the printer driver 105 performs scaling to fit the sheet having the sheet size set by the user in step S602. The setting process with respect to the printer driver 105 performed in step S607 will be described below with reference to FIGS. 8, 9, and 10.

In step S608, the CPU 201 changes the display magnification of the page in the document display area 304 in the application. More specifically, the CPU 201 sets the application 103 to display the document 305 to "fit the page width", or "display the entire document". If the data arrangement area has been set, the CPU 201 sets the display magnification according to the size or the data arrangement area. As a result, the data arrangement area changed by the plug-in 104 can be displayed in the appropriate size. Further, when the data arrangement area in the page is set, a font size may be set according to the data arrangement area. The user can thus input the characters of the font size corresponding to the size of the data arrangement area.

In step S609, the CPU 201 ends the display of the output size designation dialog 401.

Figure 7:
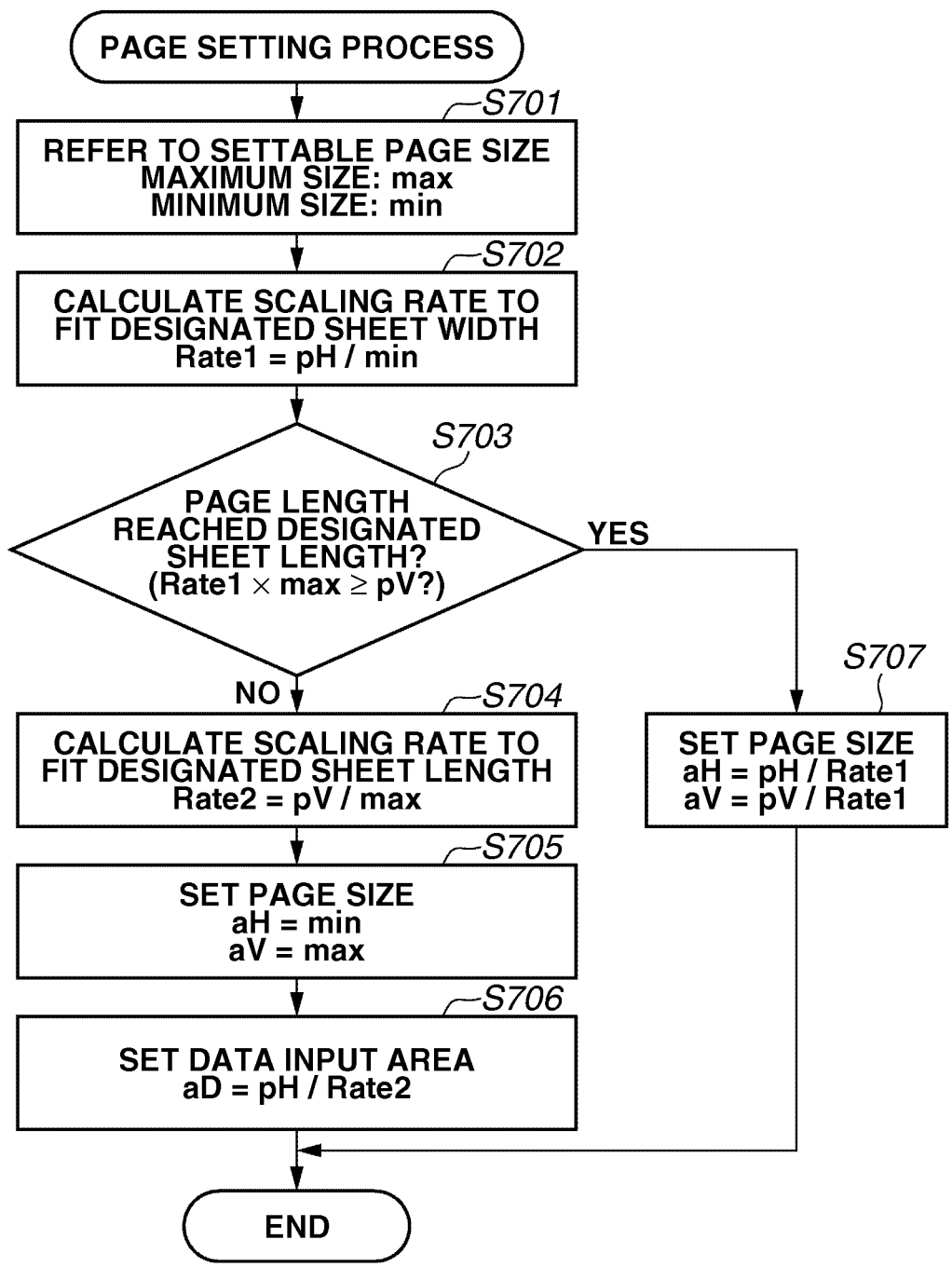
FIG. 7 is a flowchart illustrating an example of a page setting process with respect to an application.

Next, the page setting process performed in step S606 illustrated in the flowchart in FIG. 6 will be described below with reference to the flowchart illustrated in FIG. 7. The flowchart illustrated in FIG. 7 is an example of the page setting process with respect to the application.

In step S701, the plug-in 104 refers to the size restriction information 106, and obtains the page size that can be set in the application 103. According to the present exemplary embodiment, the vertical and horizontal lengths of the page are both between 100 mm and 550 mm.

In step S702, the CPU 201 calculates a scaling rate Rate1 employed in a case where a minimum width (min=100 mm) of the page size is scaled according to the direction of the sheet width (i.e., 609.6 mm) designated by the user in steps S601 to step S603 illustrated in FIG. 6. According to the present exemplary embodiment, the scaling rate Rate1 becomes 6 (i.e., ≈609.6 mm/100 mm).

In step S703, the CPU 201 determines whether the length of the sheet designated by the user is reached when the maximum length (max=550 mm) of the page with respect to the application 103 is scaled using the scaling rate Rate1 calculated in step S702. More specifically, the CPU 201 determines whether Rate1×max≥pV is satisfied or not. By performing such determination, the CPU 201 can determine whether the aspect ratio of the print sheet (i.e., the print area) designated by the user on the screen illustrated in FIG. 4 exceeds the restriction on the aspect ratio of the page that can be set in the application 103.

If the CPU 201 determines that the above equation is satisfied, and the length of the sheet designated by the user is reached (YES in step S703), the aspect ratio of the print sheet designated by the user is within the above-described restriction. The CPU 201 thus determines that the page having such aspect ratio can be set. In other words, the CPU 201 can set the page size in the application 103 to fit the aspect ratio of the sheet size designated by the user. The process then proceeds to step S707. In step S707, the CPU 201 determines the horizontal width aH and the vertical height aV of the page size illustrated in FIG. 11 respectively as pH/Rate1 and pV/Rate1. In other words, the CPU 201 sets the page size of the application 103 to have the same aspect ratio as the sheet size designated by the user, and have the minimum width (min).

Figure 14:
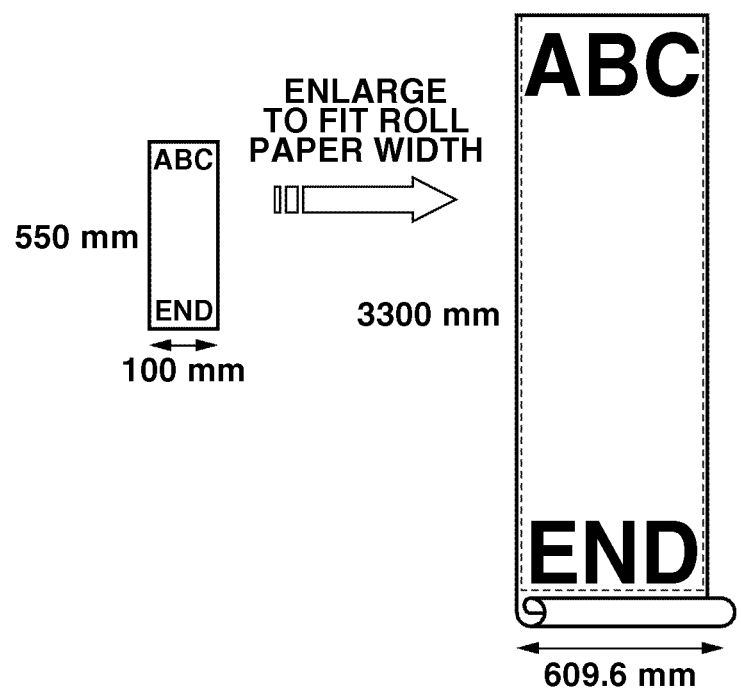
FIG. 14 illustrates an example of a print result in the case where a page length does not reach a sheet length.

On the other hand, in step S703, if the CPU 201 does not determine that Rate1×max≥pV is satisfied (NO in step S703), the page length does not reach the length of the sheet even if scaling is performed by setting the page width to be minimum. In other words, the aspect ratio of the print sheet designated by the exceeds the restriction on the aspect ratio of the sheet size that can be set in the application. The CPU 201 thus determines that the page having the aspect ratio of the print sheet cannot be set to the application. FIG. 14 illustrates an example of a print result in the case where the page length does not reach the length of the sheet. Referring to FIG. 14, the longest sheet length to which the printer 102 can print is 3300 mm (550 mm×6) even if the page is scaled using the scaling rate Rate1. To solve such an issue, the data arrangement area is set to the application 103 as described above with reference to FIGS. 12 and 13.

In step S704, the CPU 201 calculates the scaling rate for scaling the page to fit the sheet length. More specifically, the CPU 201 calculates a scaling rate Rate2=pV/max, using the sheet length pV illustrated in FIG. 11 and the maximum length max of the page. In step S705, the CPU 201 determines the page size which is vertically longest as having the width aH=min and height aV=max.

If the page size set in step S705 is scaled using the scaling rate Rate2 calculated in step S704, the image having the sheet length designated by the user is generated. However, the image extends to outside of the sheet in the width direction. In step S706, the CPU 201 thus set the data arrangement area (of width ail 1101 and height aV 1102) in the page. As a result, the data arrangement area does not extend to outside of the sheet if the page generated by the application 103 is scaled using the scaling rate Rate2. More specifically, the CPU 201 calculates the width of the data arrangement area, i.e., aD 1101, as aD=pH/Rate2. The thus calculated width aD 1101 becomes aD=max×(pH/pV) using Rate2=pV/max calculated in step S704. Accordingly, the aspect ratio of the data arrangement area (i.e., aD:max) becomes the same as the aspect ratio of the sheet size designated by the user (i.e., pH:pV). The height aV 1102 of the data arrangement area is set as max=pV/Rate2).

According to the present exemplary embodiment, the sheet length is 18000 mm. The scaling rate Rate2 thus becomes 32 (≈18000 mm/550 mm). Further, the sheet width pH is 609.6 mm, so that the width aD of the data arrangement area of the page becomes 19 mm (≈609.6 mm/32). As a result, as illustrated in FIG. 12, the margin is set in the application so that the width of the data arrangement area becomes 19 mm in the page of 100 mm×550 mm.

As described above, by performing the process illustrated in the flowchart of FIG. 7, if the sheet size designated by the user on the output size designation dialog 401 illustrated in FIG. 4 is extremely long in the vertical direction (i.e., the width is 100 mm and the length is longer than 550 mm), the data arrangement area is set in the application 103. The user can thus input the document in the data arrangement area 1201 as illustrated in FIG. 12. In addition, the document is displayed at the display magnification corresponding to the data arrangement area 1201 by performing the process in step S608 illustrated in FIG. 6.

According to the above-described exemplary embodiment, the user restricts the area in which the data to be printed can be arranged by setting the margin. However, the exemplary embodiment is not limited thereto, and the user may also set a recommended area for arranging the data. More specifically, the data arrangement area set to the application 103 by the plug-in 104 is regarded as the recommended area. However, the user may also arrange the data in an area other than the recommended area. The recommended area may be set by displaying a text box within a page as a data arrangement area. In such a case, a message such as "input to this area" may be previously inserted in the text box. Further, the recommended area may be displayed with a different color from the other area within the page. Furthermore, an arbitrary object may be arranged in the area other than the recommended area, so that the user is notified that the area will not be printed on the sheet. In such a case, a text box to which a message such as "this area will not be printed" is input may be inserted, or an image object indicating that the area will not be printed may be inserted.

The scaling setting with respect to the printer driver 105 performed in step S607 illustrated in FIG. 6 will be described below.

Figure 8:
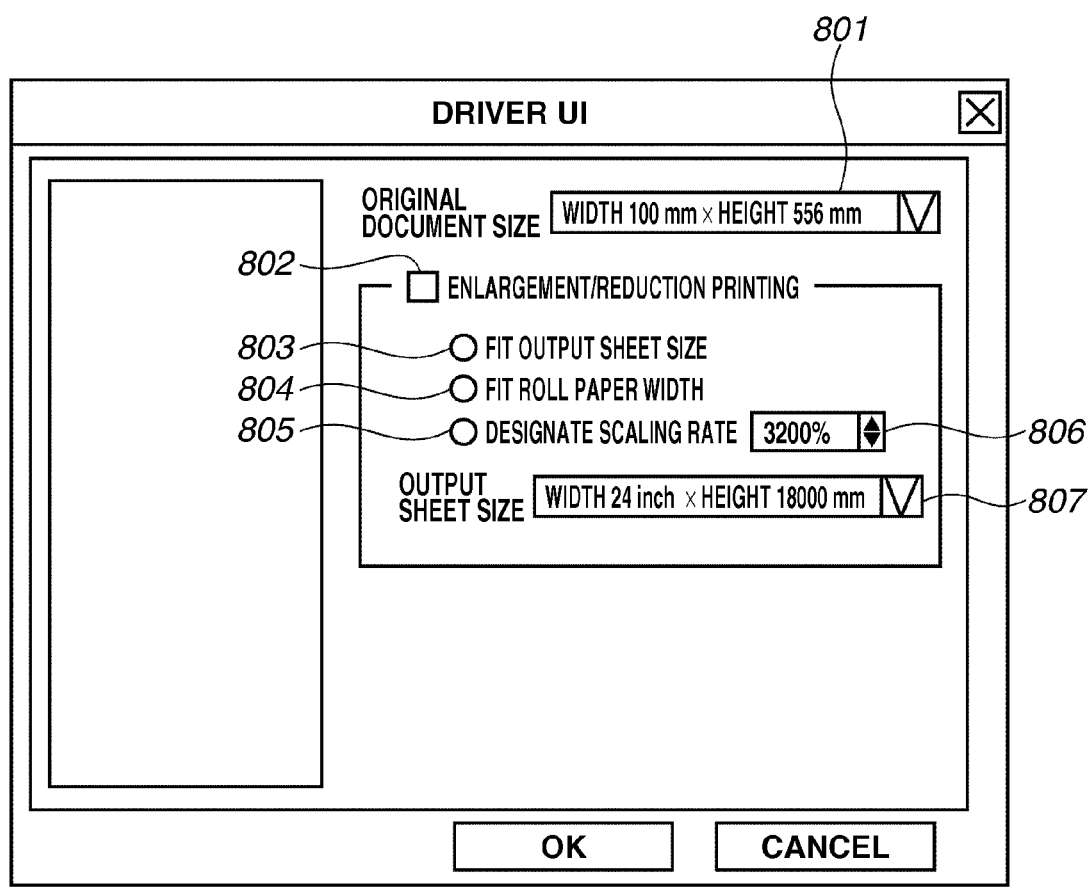
FIG. 8 illustrates a scaling setting screen of a printer driver.
Figure 9:
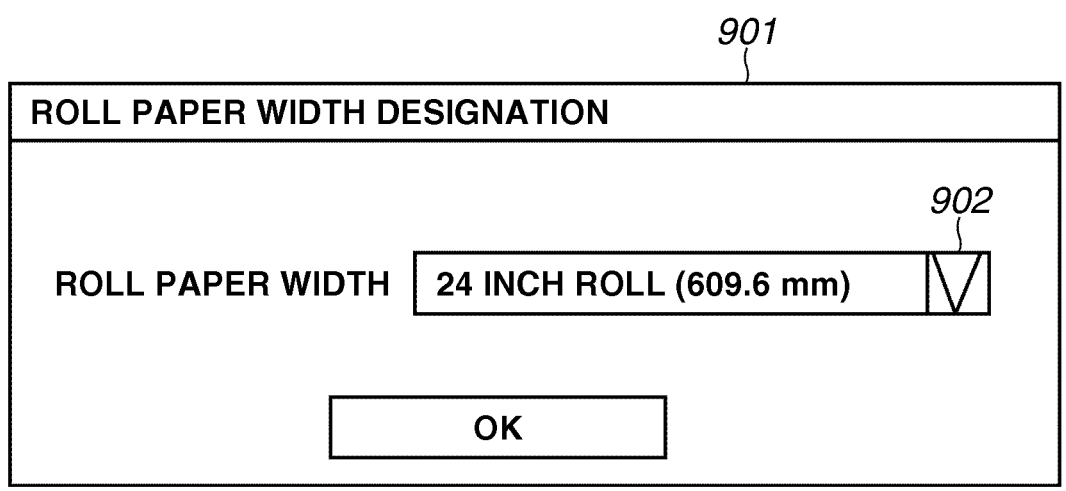
FIG. 9 illustrates a roll paper width designation dialog.

FIG. 8 illustrates a scaling setting screen of the printer driver. Referring to FIG. 8, a user issues an instruction on the screen, so that the scaling process of the printer driver 105 can be set. According to the present exemplary embodiment, the plug-in 104 instructs the printer driver 105 and performs the scaling setting instead of the user. For example, as a method for the plug-in 104 to issue an instruction to the printer driver 105, an expanded application program interface (API) included in the printer driver can be used. According to the present exemplary embodiment, the setting screens of the printer driver illustrated in FIGS. 8 and 9 are not opened when the scaling setting is performed. However, the scaling setting will be described below using the screen illustrated in FIG. 8 for ease of description.

A document size combo box 801 is a display box for designating the document size generated by the application 103. If an enlargement/reduction printing check box 802 is checked, a scaling setting can be selected from among the various scaling settings to be described below. Radio buttons 803, 804, and 805 are used for selecting the scaling setting, and one of the scaling settings can be selected. An output sheet size combo box 807 is used for designating the size of the page to be output by the printer 102.

The radio button 803 is a "fit output sheet size" radio button. If the radio button 803 is selected, the printer driver 105 scales the size designated on the document size combo box 801 to the size designated on the output sheet size combo box 807.

The radio button 804 is a "fit roll paper width" radio button. If the radio button 804 is selected, the printer driver 105 activates a roll paper width designation dialog. FIG. 9 illustrates the roll paper width designation dialog. Referring to FIG. 9, the user can designate the width of the roll paper using a combo box 902 for designating the roll paper width. The printer driver 105 thus performs scaling with respect to the page output from the application 103, so that the width is changed from the width displayed on the document size combo box 801 to the width designated on the roll paper width combo box 902.

The radio button 805 is a "designate scaling rate" radio button. If the radio button 805 is selected, the printer driver 105 performs scaling on the page of the size designated on the document size combo box 801 using the scaling rate designated on a scaling rate designation spin box 806.

In step S607 of the flowchart illustrated in FIG. 6, the plug-in 104 performs the scaling setting on the printer driver 105 so that the page size set in step S705 or step S707 illustrated in FIG. 7 is scaled according to the sheet size designated in step S601. More specifically, the plug-in 104 transmits to the printer driver 105 a command for setting the page size set in step S705 or step S707 as the document size in the printer driver 105. This process corresponds to the user operation for inputting the document size to the document size combo box 801 illustrated in FIG. 8.

Further, the plug-in 104 transmits to the printer driver 105 a command for setting the sheet size designated by the user in steps S601 to S603 as the sheet size in the printer driver 105. This process corresponds to the user operation for inputting the sheet size to the output sheet size combo box 807 illustrated in FIG. 8.

Furthermore, the plug-in 104 designates the Scaling rate to the printer driver 105. If the page size is set in step S307, the plug-in 104 designates the scaling rate Rate1 to the printer driver 105, and if the page size is set in step S705, the plug-in 104 designates the scaling rate Rate2 thereto. This process corresponds to the user operation for designating the scaling rate to the scaling rate designation spin box 806 illustrated in FIG. 8.

Figure 10:
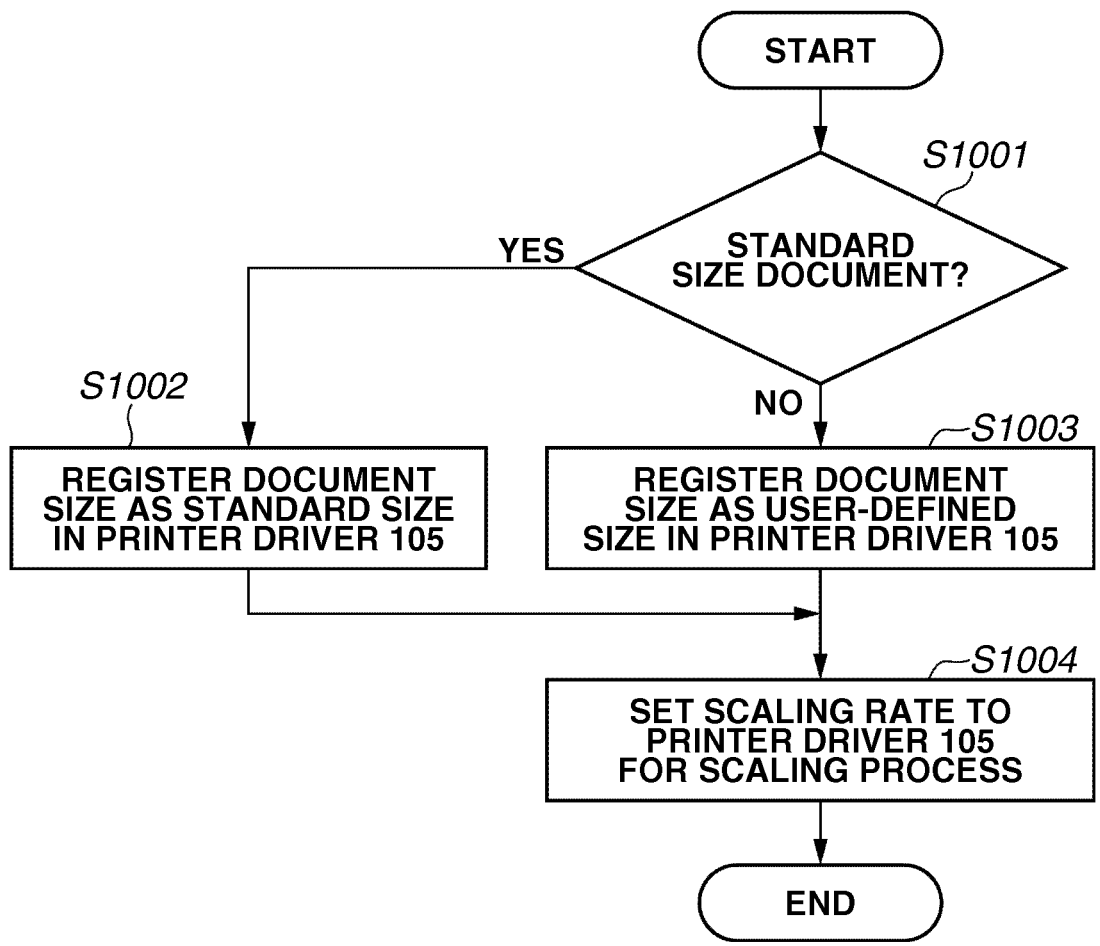
FIG. 10 is a flowchart illustrating a scaling setting process with respect to a printer driver.

According to the present exemplary embodiment, the plug-in 104 specifies the scaling setting, instead of the user, which is designated by the user as described above with reference to FIGS. 8 and 9. The process for specifying the scaling setting with respect to the printer driver 105 performed by the plug-in 104 will be described in detail below with reference to FIG. 10. FIG. 10 is a flowchart illustrating the scaling setting process with respect to the printer driver.

In step S1001, the CPU 201 determines whether the page size (i.e., the document size) set in the application 103 is a standard size. According to the present exemplary embodiment, the standard size is a size previously registered in the printer driver 105, such as international standards organization (ISO) A4 (210 mm×297 mm) and ISO A3 (297 mm×420 mm).

If the CPU 201 determines that the page size is the standard size (YES in step S1001), the process proceeds to step S1002. In step S1002, the CPU 201 sets to the printer driver 105 the page size which is the standard size. This setting corresponds to registration of the page size, i.e., the standard size, in the document size combo box 801 illustrated in FIG. 8.

If the CPU 201 determines that the page size is not the standard size (NO in step S1001), the process proceeds to step S1003. In step S1003, the CPU 201 registers in the printer driver 105 the size which is not the standard size as a user-defined size. The printer driver 105 includes a user-defined size registration function which can register arbitrary sizes (i.e., user defined sizes) so that the sizes other than the previously registered standard sizes can be used in the printing. In step S1003, the plug-in 104 thus utilizes the user-defined size registration function.

Then, in step S1004, the plug-in 104 sets to the printer driver 105 the scaling rate for performing the scaling process. This setting corresponds to the scaling rate setting in the scaling rate designation spin box 806 illustrated in FIG. 8. According to the present exemplary embodiment, the Rate1 or the Rate2 set in step S705 or step S707 illustrated in FIG. 7 is set.

As described above, the plug-in 104 performs settings on the printer driver 105 for enlarging or reducing the data to be printed.

For example, if the page size having the same aspect ratio as the aspect ratio of the sheet designated by the user in the output size designation dialog 401 illustrated in FIG. 4 can be set to the application 103, the Rate1 is set as the scaling rate. The Rate1 is determined according to the sheet size designated by the user as described above. Therefore, if the printer driver 105 enlarges a page generated by the application 103 according the scaling rate Rate1, the page is printed in the size corresponding to the sheet size.

On the other hand, if the aspect ratio of the sheet designated by the user is vertically longer than the restriction on the aspect ratio of the page that can be set in the application 103, the Rate2 is set to the printer driver 105 as the enlarging rate. The data generated by the application 103 is then enlarged to be greater the size of the sheet designated by the user as illustrated in FIG. 13. However, the data arrangement area in the application 103 is restricted to fit the sheet size. Accordingly, if the page is enlarged to extend to outside of the sheet as described above, the margin in which the data is not input extends to outside of the sheet, so that the data arrangement area is printed on the sheet. The data input to the application 103 by the user is thus appropriately printed on the sheet.

As described above, according to the present exemplary embodiment, if the aspect ratio of the sheet designated by the user exceeds the limit of the aspect ratio of a page that can be set in the application 103, the setting of a data arrangement area is performed in the page of the application 103. According to this area setting process, the data arrangement area is restricted according to the aspect ratio of the sheet. Thus, the data arrangement area in the page is arranged on the sheet if the printer driver 105 scales the page to be printed to fit the sheet. The data input to the application 103 by the user is thus appropriately printed on the sheet.

Further, according to the present exemplary embodiment, a page to be printed output from the application 103 to the printer driver 105 is not divided into a plurality of pages, and is output as one page. It thus prevents a break between pages to be formed as a margin in a print result. Furthermore, as described above, according to the present exemplary embodiment, data to be printed is arranged in one data arrangement area which is continuous within one page. Therefore, the application 103 is set so that data to be originally printed as one object, such as a photographic image, is included in the one continuous data arrangement area. It thus prevents the data which is originally to be printed as one object from being divided by the margins between the pages.

According to the above-described exemplary embodiment, it is determined whether the aspect ratio of the sheet size designated by the user exceeds the limit on the aspect ratio of the page in the application. If the aspect ratio of the sheet size designated by the user exceeds the limit on the aspect ratio of the page in the application, the data arrangement area is set in the page in the application. However, the exemplary embodiment is not limited thereto, and the application 103 may be set as follows without performing the above-described determination. The aspect ratio of the print area on which the image is to be printed on the sheet of the size designated by the user is identified. The data arrangement area of the aspect ratio which is the same as the identified aspect ratio is then set to the application 10.

Further, according to the above-described exemplary embodiment, the user designates the sheet size to be printed on. However, the exemplary embodiment is not limited thereto, and the user may designate the size of the area on which the image is to be printed in the sheet. In such a case, the plug-in 104 sets the application 103 so that the aspect ratio of the area in the sheet designated by the user matches the aspect ratio of the data arrangement area in the page in the application 103. The printer driver 105 then performs scaling so that the size of the data arrangement area in the application 103 fits to the size of the area in the sheet designated by the user.

Further, according to the above-described exemplary embodiment, when the plug-in 104 performs the settings to the application 103 and the printer driver 105, an editing screen of the application 103 as illustrated in FIG. 12 is displayed. In other words, after the user has caused the plug-in 104 to perform the settings, the user inputs to the application 103 data such as desired characters.

However, the exemplary embodiment is not limited to this example. When the user inputs the desired data to the application 103 and the plug-in 104 is activated, the plug-in 104 may execute the above-described setting processes, and printing may be automatically performed. In such a case, when the plug-in 104 designates scaling of the page data to the printer driver 105, the plug-in 104 instructs the printer driver 105 to perform printing. This instruction corresponds to the user operation for pressing an OK button on the operation screen illustrated in FIG. 8.

In other words, the user inputs the data to the page of an arbitrary page size in the application 103, presses the activation icon 307, and activates the plug-in 104. The output size designation dialog 401 illustrated in FIG. 4 is then displayed. When the user inputs the desired sheet size and presses the sheet generation button 404, the plug-in 104 performs the settings to the application 103 and the printer driver 105, and printing is thus performed to fit to the sheet size designated by the user.

For example, if the aspect ratio of the sheet designated by the user is extremely long in the vertical direction, the data arrangement area with respect to the application 103 is set by performing the area setting process in step S706 illustrated in FIG. 7. The page size and the data arrangement area are then temporarily changed from the page of when the user has input and instructed editing of the data to the application 103. The data arrangement area of the aspect ratio corresponding to the vertically long sheet size is set such as illustrated in FIG. 12. The application 103 then outputs to the printer driver 105 the data to be printed according to the changed page size and data arrangement area, and the printer driver 105 performs scaling as illustrated in FIG. 13. As a result, the user can print the data input to the application 103 without exceeding the data to outside of the sheet.

If the settings of the application 103 and the printer driver 105 and the printing process are performed in response to activation of the plug-in 104 as described above, it is not necessary to display the display screen illustrated in FIG. 12.

The page size and the data arrangement area are temporarily changed for printing. Thus, after instructing the printer driver 105 to perform printing, the plug-in 104 may instruct the application 103 to restore the page size and the data arrangement area to original settings. The page size and the data arrangement area which have been set before printing can thus be maintained even if the plug-in 104 performs printing.

According to the above-described exemplary embodiment, the CPU 201 determines in step S703 illustrated in FIG. 7, whether the page having the aspect ratio of the sheet designated by the user can be set to the application 103. In such a case, the CPU 201 determines whether a page of which external dimensions are the aspect ratio of the sheet designated by the user can be set to the application 103 without including the margins in the page. For example, as described above, the CPU 201 determines whether the aspect ratio of the sheet designated by the user is vertically longer than the external dimensions of the page (i.e., 550 mm in the vertical direction and 100 mm in the horizontal direction).

However, the exemplary embodiment is not limited thereto, and the CPU 201 may determine whether the data arrangement area having the aspect ratio of the designated sheet can be set using a predetermined margin setting of the application 103 to include the margins in the page. In such a case, if the CPU 201 determines that the data arrangement area can be set using a predetermined margin setting, the page size is set so that the data arrangement area corresponding to the margin setting has the aspect ratio of the sheet size designated by the user. On the other hand, if the CPU 201 determines that the aspect ratio of the sheet size designated by the user cannot be achieved using the predetermined margin setting, the margin setting is adjusted so that the data arrangement area having the above-described aspect ratio is set.

Further, according to the above-described exemplary embodiment, the printer driver 105 generates and scales an image. However, the application 103 or the plug-in 104 may generate and scale an image.

Furthermore, according to the above-described exemplary embodiment, the program (i.e., the plug-in 104) corresponding to the processes indicated in the present exemplary embodiment is provided separately from the application 103 and the printer driver 105. However, the exemplary embodiment is not limited to this example, and the plug-in 104 may be previously integrated as a function of the application 103 or the printer driver 105.

Moreover, according to the above-described exemplary embodiment, when a print product is to be used as a hanging banner, an example in which the roll paper is used in the vertical direction with respect to the page of the document application is described. However, the exemplary embodiment is not limited this example, and the roll paper may be used in the horizontal direction with respect to the page, such as in the case where the print product is to be used as a horizontal banner. In such a case, if the aspect ratio of the sheet size designated by the user is horizontally longer than the aspect ratio of the page size that can be set in the application, the data arrangement area in the application is restricted according to the horizontally-long sheet size. Accordingly, the data such as the characters arranged in the data arrangement area in the page of the application can be appropriately printed on the horizontally long sheet.

According to the above-described exemplary embodiment, the document application is described as an example of the application. However, the exemplary embodiment is not limited thereto, and the process described according to the present exemplary embodiment is applicable to various applications such as a spreadsheet application.

Further, the present exemplary embodiment can also be realized by executing the following processing. More specifically, software (a program) for realizing the functions of the above-described exemplary embodiment is supplied to a system or an apparatus via a network, or various storage media and a computer (or a CPU or a micro processing unit (MPU)) of the system or the apparatus reads and executes the program. The program code for realizing the functions thereof may be executed by one computer, or by a plurality of computers cooperating with each other. Furthermore, the program code may be executed by the computer, or hardware such as a circuit for realizing the functions of the program code may be provided and realize the process corresponding to a portion of or the entire program code. Moreover, a portion of the processes described in the present exemplary embodiment may be realized by software, and the remaining portion may be realized by hardware.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-220480 filed Oct. 2, 2012, which is hereby incorporated by reference herein in its entirety.

What is claimed is:

1. An apparatus comprising:
   an input unit configured to input a sheet size of a sheet to be used when data arranged in a page of an application is printed;
   a determining unit configured to determine whether an aspect ratio of the sheet size input by the input unit exceeds a restriction on an aspect ratio of the page that can be set in the application,
   a first setting unit configured to execute, in a case where the determining unit determines that the aspect ratio of the sheet size exceeds the restriction, a setting to the application so that an aspect ratio of a data arrangement area in which the data to be printed is arranged fits to the aspect ratio of the sheet size, wherein a part of the page is set as the data arrangement area;
   a second setting unit configured to execute a scaling setting for scaling of the data arranged in the data arrangement area determined in the page by the setting by the first setting unit so that the data arrangement area fits to the sheet size by the scaling; and
   at least one microprocessor programmed to implement at least one of the input unit, the first setting unit, and the second setting unit.

2. The apparatus according to claim 1, wherein the second setting unit executes the scaling setting so that an area outside of the data arrangement area in the page extends to outside of the sheet size and the data arrangement area fits the sheet size.

3. The apparatus according to claim 1, wherein in a case where the determining unit determines that the aspect ratio of the sheet size does not exceed the restriction, the first setting unit executes a page size setting to the application so that a page having the aspect ratio is set in the application, and the second setting unit executes the scaling setting so that the page fits to the sheet size by scaling of the data.

4. The apparatus according to claim 1, wherein an area in which the data to be printed can be arranged is restricted to the data arrangement area in the page set in the application.

5. The apparatus according to claim 1, wherein the first setting unit sets a size of a margin in the page in the application.

6. The apparatus according to claim 1, wherein the first setting unit executes the setting so that an area in which it is recommended to arrange the data to be printed in the page is set in the application.

7. The apparatus according to claim 1, wherein the second setting unit executes the scaling setting to a printer driver.

8. The apparatus according to claim 7, further comprising a print control unit configured to cause a printing apparatus to print an image which is based on the data which is arranged in the data arrangement area and is scaled by the printer driver according to the scaling setting set by the second setting unit.

9. The apparatus according to claim 7, wherein the second setting unit sets a scaling rate to the printer driver.

10. A method using at least one programmed microprocessor, the method comprising:
    inputting a sheet size of a sheet to be used when data arranged in a page of an application is printed;
    determining whether an aspect ratio of the sheet size input by the inputting exceeds a restriction on an aspect ratio of the page that can be set in the application,
    a first setting act of executing, in a case where it is determined that the aspect ratio of the sheet size exceeds the restriction, a setting to the application so that an aspect ratio of a data arrangement area in which the data to be printed is arranged fits to the aspect ratio of the sheet size input by the inputting, wherein a part of the page is set as the data arrangement area;

a second setting act of executing a scaling setting for scaling of the data arranged in the data arrangement area determined in the page by the setting by the first setting act so that the data arrangement area fits to the sheet size by the scaling; wherein at least one of the inputting, the first setting act, and the second setting act is performed by the at least one programmed microprocessor.

11. The method according to claim 10, further comprising executing the scaling setting so that an area outside of the data arrangement area in the page extends to outside the sheet size and the data arrangement area fits the sheet size.

12. The method according to claim 10, wherein in a case where it is determined that the aspect ratio of the sheet size does not exceed the restriction, the first setting act executes a page size setting to the application so that a page having the aspect ratio is set in the application; and the second setting act executes the scaling setting so that the page fits to the sheet size by scaling of the data.

13. The method according to claim 10, wherein an area in which the data to be printed can be arranged is restricted to the data arrangement area in the page set in the application.

14. The method according to claim 10, wherein the first setting act sets a size of a margin in the page in the application.

15. The method according to claim 10, wherein the first setting act executes the setting so that an area in which it is recommended to arrange the data to be printed in the page is set in the application.

16. The method according to claim 10, wherein the second setting act executes the scaling to a printer driver.

17. The method according to claim 16, further comprising causing a printing apparatus to print an image which is based on the data which is arranged in the data arrangement area and is scaled by the printer driver according to the scaling setting set by the second setting act.

18. A non-transitory computer-readable medium storing a program for causing a computer to perform the method according to claim 10.

19. The method according to claim 16, wherein the second setting act sets a scaling rate to the printer driver.

20. A non-transitory storage medium storing a plug-in program which expands functions of an application and causes a computer to execute a method, the method comprising:

inputting a sheet size of a sheet to be used when data arranged in a page of an application is printed;

determining whether an aspect ratio of the sheet size input by the inputting exceeds a restriction on an aspect ratio of the page that can be set in the application, a first setting act of executing, in a case where it is determined that the aspect ratio of the sheet size exceeds the restriction, a setting to the application so that an aspect ratio of a data arrangement area in which the data to be printed is arranged fits to the aspect ratio of the sheet size input by the inputting, wherein a part of the page is set as the data arrangement area;

a second setting act of executing a scaling setting for scaling of the data arranged in the data arrangement area determined in the page by the setting by the first setting act so that the data arrangement area fits to the sheet size by the scaling; wherein the inputting, the first setting act, and the second setting act are performed by execution of the plug-in program by the computer.

* * * * *